Patented Mar. 18, 1952

2,589,653

UNITED STATES PATENT OFFICE 2,589,653

PRODUCTION OF SILICON SULFIDE

Claudio Alvarez-Tostado and William B. Harlow, Palo Alto, Calif.

No Drawing. Application May 2, 1949,
Serial No. 91,025

5 Claims. (Cl. 23—206)

This invention relates to a method for the production of silicon sulfide.

Although it has been known that silicon sulfide can be made by the direct reaction of silicon and sulfur the reaction is so slow and the yields are so low that the production of silicon sulfide in this manner is economically unattractive.

It has now been found that silicon sulfide can be readily made in satisfactory yield by the reaction of sulfur with silicon or an alloy of silicon such as ferrosilicon in the presence of a silicate glass. It is desirable that the reagents be mixed in relatively finely divided form and that the glass be present in the reaction mixture in a form which presents a high specific surface such as glass wool or powdered glass. Under these conditions the reaction between the sulfur and silicon once initiated progresses to substantial completion without the supply of further heat. When the reaction mixture consists of metallic silicon and sulfur, the reaction may be initiated by heating the mixture locally or throughout to a temperature of about 750° C. When the metallic silicon is in the form of an alloy, such as ferrosilicon, somewhat higher temperatures are required to initiate the reaction.

The following examples are illustrative of the principles of the invention:

Example I

Thirty-seven parts by weight of finely powdered silicon and sixty-three parts by weight of flowers of sulfur are intimately mixed in a mortar and pestle. The mixture is layered with glass wool in a heavy "Pyrex" glass tube in alternate thin layers and the tube is placed in a fireclay cylinder. The cylinder is heated at a low red heat, about 900 to 1000° C., until the reaction begins. The reaction proceeds rapidly and a temperature high enough to sublime the silicon sulfide is generated in the reaction.

Example II

A mixture of finely powdered ferrosilicon (75% silicon) and flowers of sulfur in approximately the same proportion as in Example I are layered with glass wool in a "Pyrex" glass tube and heated in a clay cylinder as in Example I.

The reaction proceeds as in Example I except that the silicon sulfide formed does not sublime to any substantial extent but remains in the reaction mass.

Example III

Forty-six parts by weight of powdered silicon and fifty-four parts by weight of flowers of sulfur are mixed and layered with glass wool in a fireclay crucible as described in Example I. A length of magnesium ribbon is inserted in the mixture in the tube and ignited. This initiates the reaction which proceeds with formation of silicon sulfide as in Example I.

Finely ground "Pyrex" glass may be used in place of glass wool in the foregoing examples. The proportions of reactants are not highly critical but may be varied by from 10% to 20% from the proportions given in the examples. In general, it is preferable that the atomic proportion of sulfur to silicon be somewhat greater than 1:1.

The silicon sulfide made by the method of the invention is useful for the production of alkyl esters of silicic acid by reaction with alcohols. The silicon sulfide also reacts readily with water to produce hydrogen sulfide.

We claim:

1. A method of making silicon sulfide which comprises heating an intimate mixture of finely divided sulfur and a finely divided silicon material of the group consisting of elemental silicon and ferrosilicon in the proportion of at least one atom of sulfur to each atom of silicon in the presence of a siliceous glass in a form having a large surface area selected from the group consisting of fibers and powder in contact with said mixture to a temperature of from about 750° to about 1000° until reaction between the sulfur and the silicon material is initiated.

2. A method of making silicon sulfide which comprises heating an intimate mixture of finely divided sulfur and a finely divided silicon material of the group consisting of elemental silicon and ferrosilicon in the proportion of at least one atom of sulfur to each atom of silicon in the presence of a siliceous glass wool in contact with said mixture to a temperature of from about 750° to about 1000° until reaction between the sulfur and the silicon material is initiated.

3. A method of making silicon sulfide which comprises heating an intimate mixture of finely divided sulfur and a finely divided silicon material of the group consisting of elemental silicon and ferrosilicon in the proportion of at least one atom of sulfur to each atom of silicon in the presence of a siliceous glass powder in contact with said mixture to a temperature of from about 750° to about 1000° until reaction between the sulfur and the silicon material is initiated.

4. A method of making silicon sulfide which comprises heating an intimate mixture of finely divided sulfur and finely divided metallic silicon in the proportion of at least one atom of sulfur to each atom of silicon in the presence of a siliceous glass in a form having a large surface area selected from the group consisting of fibers and powder in contact with said mixture to a temperature of at least about 750° C. until reaction between the sulfur and the silicon is initiated.

5. A method of making silicon sulfide which comprises heating an intimate mixture of finely divided sulfur and finely divided ferrosilicon in the presence of a siliceous glass in a form having a large surface area selected from the group consisting of fibers and powder in contact with said mixture to a temperature of about 900° to 1000° C. until reaction between the sulfur and the ferrosilicon is initiated.

CLAUDIO ALVAREZ-TOSTADO.
WILLIAM B. HARLOW.

REFERENCES CITED

The following references are of record in the file of this patent:

Mellor: "Comp. Treatise on Inorg. and Theor. Chem.," vol. 6, pp. 985–987, 1925.

Thorpe: "Dict. of Applied Chem.," vol. 4, pp. 679, 680, 1916.

Chemical Abstracts, vol. 5, pp. 1567, 1911.